(12) United States Patent
Allen

(10) Patent No.: US 12,462,956 B2
(45) Date of Patent: *Nov. 4, 2025

(54) CABLE WITH FABRIC SLEEVE AND ITS METHOD OF MANUFACTURE

(71) Applicant: WESCO Distribution, Inc., Pittsburgh, PA (US)

(72) Inventor: Jerry L. Allen, Sarasota, FL (US)

(73) Assignee: WESCO Distribution Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,092

(22) Filed: Feb. 19, 2024

(65) Prior Publication Data

US 2024/0194376 A1 Jun. 13, 2024

Related U.S. Application Data

(60) Division of application No. 17/728,186, filed on Apr. 25, 2022, now abandoned, which is a continuation of application No. 16/429,229, filed on Jun. 3, 2019, now Pat. No. 11,342,098.

(60) Provisional application No. 62/681,744, filed on Jun. 7, 2018.

(51) Int. Cl.
*H01B 13/22* (2006.01)
*H01B 17/58* (2006.01)

(52) U.S. Cl.
CPC ............. *H01B 13/22* (2013.01); *H01B 17/58* (2013.01)

(58) Field of Classification Search
CPC ....................................................... H01B 13/22
See application file for complete search history.

(56) References Cited

U.S. PATENT DOCUMENTS

| | | | | |
|---|---|---|---|---|
| 5,278,356 | A * | 1/1994 | Miller | C09J 7/20 174/117 A |
| 5,480,203 | A * | 1/1996 | Favalora | B25B 25/00 24/115 N |
| 6,398,190 | B1 * | 6/2002 | Li | H02G 1/08 254/134.3 FT |
| 10,518,511 | B2 * | 12/2019 | Malloy | C09J 7/21 |
| 11,342,098 | B2 * | 5/2022 | Allen | H01B 13/22 |
| 2009/0314517 | A1 * | 12/2009 | Allen | H02G 1/08 174/124 R |
| 2014/0356564 | A1 * | 12/2014 | Yamaguchi | H02G 3/0481 428/36.1 |

* cited by examiner

*Primary Examiner* — Jeffry H Aftergut
(74) *Attorney, Agent, or Firm* — Renner, Kenner, Greive, Bobak, Taylor & Weber

(57) ABSTRACT

A fabric wrapped cable is formed by positioning adhesive on opposed layers of fabric. A cable is positioned between those layers and the layers are attached by attaching the adhesive of one layer to the adhesive of the other layer. In forming the wrapped cable in such a manner, the cable is provided with at least one wing.

6 Claims, 2 Drawing Sheets

CABLE WITH FABRIC SLEEVE AND ITS METHOD OF MANUFACTURE

CROSS-REFERENCE TO RELATED APPLICATION

This application is a divisional application of U.S. patent application Ser. No. 17/728,186 filed on Apr. 25, 2022, which is a continuation of U.S. patent application Ser. No. 16/429,229 filed on Jun. 3, 2019 and now issued as U.S. Pat. No. 11,342,098, which claimed priority of from U.S. Provisional Patent Application Ser. No. 62/681,744 filed on Jun. 7, 2018, which are incorporated herein by reference in their entirety.

TECHNICAL FIELD

This invention relates to a fabric enclosed cable and the method of assembling a cable with a fabric sleeve so that the cable may be easily inserted into a communications conduit.

BACKGROUND ART

Positioning cables in underground communication conduits which extend for several thousand feet has long been a problem. Such is particularly true when it is desired to position an additional cable or cables into a conduit that already has a cable in it. That cable, particularly because of its plastic jacket, provides a great deal of friction to the new cable as it is being inserted into the conduit. As a result, the new or the existing cable may be damaged due to that friction. Such is particularly true when the cable in the conduit is ungulating which causes the cable being introduced to take a sinuous, fraction-laden path.

An extremely successful solution to this problem is a fabric innerduct sold under the trademark MAXCELL® by TVC Communications, LLC and shown in U.S. Pat. No. 6,262,371 which is incorporated herein by reference for whatever details may be necessary to understand the present invention. This innerduct is first positioned in a conduit and divides the conduit into longitudinally extending compartments. A cable can be positioned in one of the compartments, and a pull tape or rope can be positioned in another compartment which can later be utilized to pull a second cable into that compartment. Because there is fabric between the cables, the friction is not on the cable jacket but on the fabric which makes installation easier.

However, a problem can exist when using these innerducts in small diameter conduits which extend long distances. In these small conduits, the fabric innerduct takes up much of the space in the conduit and the tape or rope may tend in lock up in the innerduct thereby impeding the ability to pull in a cable.

As a result, a fabric encased cable was designed as shown in U.S. Pat. No. 9,054,507 which is incorporated herein by reference for whatever details may be necessary to understand the present invention. While such represents a vast improvement in the art, an improved cable and a simple manner in which to attach the fabric to the cable has not yet been developed.

DISCLOSURE OF THE INVENTION

It is thus an object of one aspect of the present invention to provide a method of attaching a fabric to a cable.

It is an object of another aspect of the present invention to provide the attachment utilizing an adhesive.

It is an object of an additional aspect of the present invention to provide a wrapped cable with wings extending outwardly therefrom.

These and other objects of the present invention, as well as the advantages thereof over existing prior art forms, which will become apparent from the description to follow, are accomplished by the improvements hereinafter described and claimed.

In general, a method of attaching a fabric material to a cable includes the steps of positioning an adhesive on opposed layers of fabric, positioning a cable between the layers, and attaching the adhesive of one layer to the adhesive of the other layer to confine the cable between the layers.

The wrapped cable formed by this method includes a fabric encased cable having at least one wing extending outwardly from the cable.

Preferred methods to make a fabric encased cable with wings are depicted in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
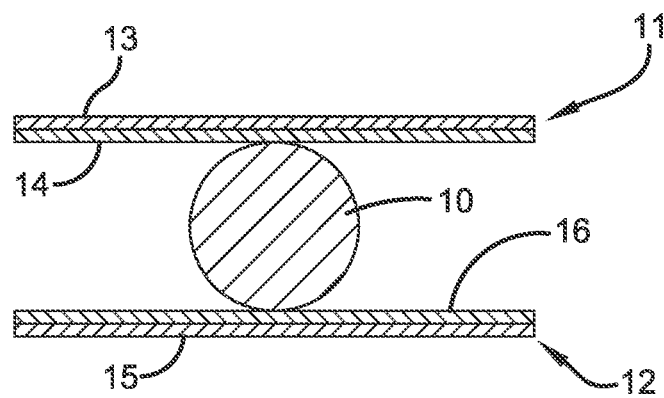
FIG. 1 is a sectional view of a cable positioned between two layers of fabric material.

A conventional communications cable is indicated by the numeral 10 in the drawings. Cable 10 traditionally includes core of wires covered by a plastic sheath. Such cables are usually stored on a roll, which may carry 2500 feet or more of cable.

As shown in FIG. 1, in order to wrap a cable 10 with a pliant material, such as a fabric with a lower coefficient of friction than the sheath of the cable, a first sheet assembly, generally indicated by the numeral 11, and a second sheet assembly, generally indicated by the numeral 12, are provided. Sheet assembly 11 extends longitudinally along the length of cable 10 and includes a fabric layer 13 having an adhesive layer 14 attached thereto. Similarly, sheet assembly 12 extends longitudinally along the length of cable 10 and includes a fabric layer 15 having an adhesive layer 16 attached thereto.

Figure 2:
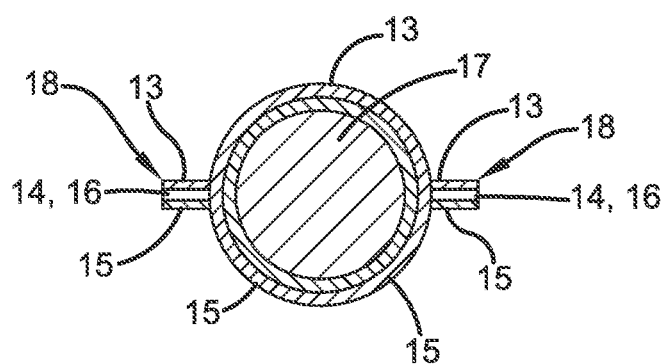
FIG. 2 is a sectional view like FIG. 1 but showing the layers wrapped around the cable.

In order to create the fabric wrapped cable 17 shown in FIG. 2, assemblies 11 and 12 are positioned as shown in FIG. 1 such that adhesive layers 14 and 16 are opposed to each other with the conventional cable 10 being positioned between layers 14 and 16. Then assemblies 11 and 12 are wrapped around cable 10 with adhesive layers 14 and 16 engaging cable 10 to form wrapped cable 17. The lateral edges of assemblies 11 and 12 form wings 18 when the lateral edges of adhesive layers 14 and 16 engage each other. The wings 18 extend radially outwardly from generally diametrically opposed sides of cable 17. Such wings 18 tend to add strength to the cable 17, and they can be utilized to pull the cable into a conduit. That is, a pulling device can be attached to, or otherwise grasp, the wings of a cable to insert it into a conduit.

The wrapped cable 17 can be created by longitudinally moving cable 10 together with sheet assemblies 11 and 12 and providing a folding station. When the cable 10 and assemblies 11 and 12 pass through that station, assemblies 11 and 12 are wrapped around cable 10 as previously described. Such can be accomplished at the manufacturing site of the cable, or such can be provided at the site where the wrapped cable 17 is to be installed in a conduit. In that instance, a roll of cable 10 and rolls of sheet assemblies 11 and 12 can be provided and fed through a device which will wrap cable 10 as the resultant cable 17 is being installed in a conduit.

Figure 4:
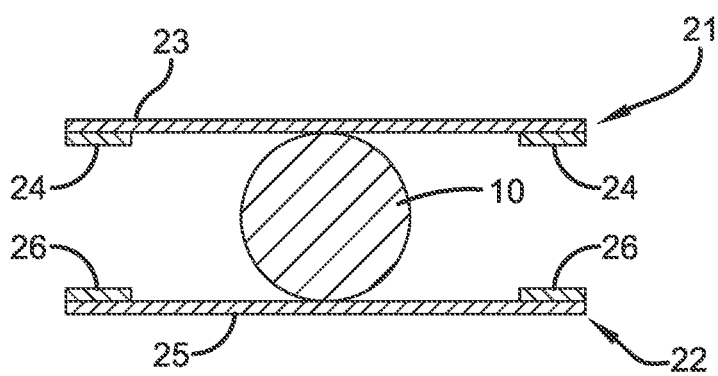
FIG. 4 is a sectional view of an alternative embodiment to that shown in FIG. 1, and showing a cable positioned between two layers of fabric material.
Figure 5:
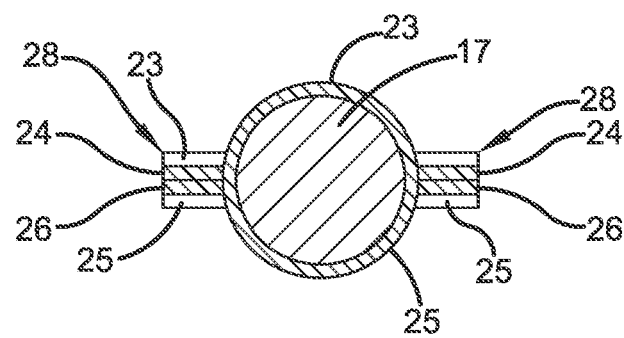
FIG. 5 is a sectional view like FIG. 4 but showing the layers wrapped around the cable.

An alternative manner in which to wrap a cable 10 is shown in FIGS. 4 and 5. There, a first sheet assembly 21 and a second sheet assembly 22 are provided. Sheet assembly 11 includes a fabric layer 23, which can be identical to fabric layer 13. Sheet assembly 23 also includes an adhesive layer which is formed of two small layers 24 located at the lateral peripheries of fabric layer 23. Similarly, sheet assembly 22 includes a fabric layer 25 which can be identical to fabric layer 15. Sheet assembly 22 also includes an adhesive layer which is formed of two small layers 26 located at the lateral periphery of fabric layer 25.

Figure 3:
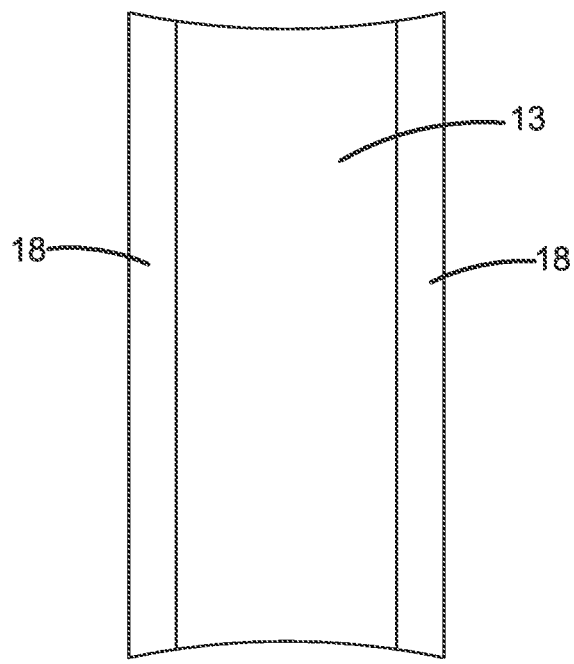
FIG. 3 is a fragmented top plan view of that which is depicted in FIG. 2.

In order to create the fabric wrapped cable 17 shown in FIG. 5, assemblies 21 and 22 are positioned as shown in FIG. 4, the adhesive layers 24 and 26 being opposed to each other with cable 10 being positioned between sheet assemblies 21 and 22. Then assemblies 21 and 22 are wrapped tightly around cable 10 and adhesive layers portions 24 engage adhesive layer portions 26, as shown in FIG. 5 to form wings 28. It is also contemplated that the embodiment of FIG. 5 will satisfactorily create a cable 17 if only one of the sheet assembles 23, 25 is provided with an adhesive portion 24 or 26. Thus, the remaining adhesive portion would be attached directly to the opposed sheet assembly. In either event, the resulting plan view of FIG. 5 is identical to FIG. 3. The resulting fabric wrapped cable 17 can be manufactured in the same manner as described with respect to the embodiment of FIGS. 1-3.

Figure 6:
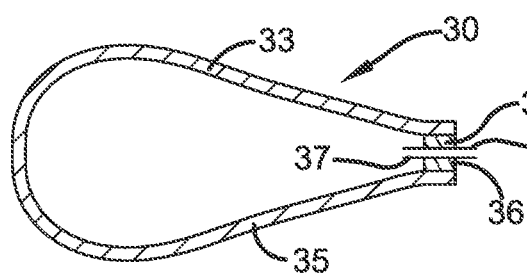
FIG. 6 is a sectional view of yet another embodiment depicting two opposed layers of material.
Figure 7:
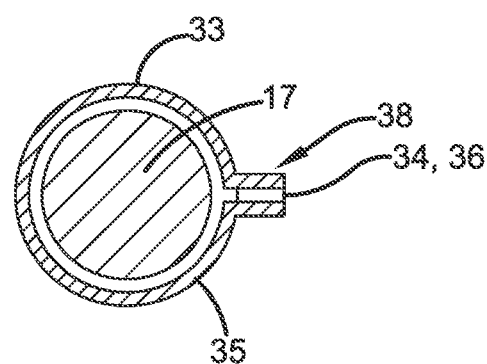
FIG. 7 is a sectional view showing that which is shown in FIG. 6 wrapped around a cable.
Figure 8:
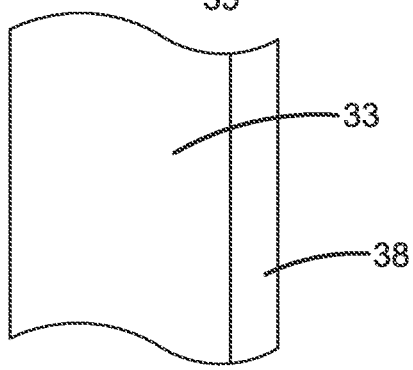
FIG. 8 is a fragmented top plan view of that which is depicted in FIG. 7.

Another cable wrapping version is shown in FIGS. 6-8. There, one continuous sheet of fabric material, generally indicated by the numeral 30, is folded to form a first fabric layer 33 having a small adhesive layer 34 at the end thereof, and forms a second fabric layer 35 having a small adhesive layer 36 at the end thereof. Layers 34, 36 thus make material 30 thicker at its ends. When material 30 is manufactured, a release sheet 37 is positioned on each adhesive layer 34, 36.

When it is desired to create the fabric wrapped cable 17 shown in FIG. 7, a cable 10 is positioned between layers 33 and 35 by extending it through the opening between adhesive layers 34 and 36. Then the release sheets 37 are removed from adhesive layers 34, 36, and layers 33 and 35 are tightened around cable 10 to form a wrapped cable 17 with the adhesive layers 34, 36 being attached to each other to form a wing 38. When the cable 10 is encased by the fabric 30, as shown in FIG. 7, the adhesive of layers 34 and 36 does not contact cable 10 such that the fabric 30 is not adhesively bonded to the cable.

In view of the foregoing, it should thus be evident that any of the disclosed options for creating a wrapped cable will accomplish the objects of the invention and otherwise substantially improve the art.

What is claimed is:

1. A method of preparing a single cable having a length for insertion into a conduit comprising the steps of providing a single sheet of fabric material extending the length of the cable and having separate layers on the same side of the sheet only at each end of the sheet thereby making the ends of the sheet thicker than a rest of the sheet, the fabric material having a coefficient of friction less than that of the cable relative to the conduit; positioning the fabric material around, and in contact with, the cable; and attaching the separate layers so as to encase the cable in contact with the fabric material without attaching the fabric material to the cable, and so as to form a wing extending outwardly from the cable, which wing may be thereafter selectively utilized when inserting the cable into a conduit.

2. The method of claim 1 wherein the layers are an adhesive.

3. A method of preparing a single cable having a length for insertion into a conduit comprising the steps of providing a single sheet of fabric material extending the length of the cable and having separate layers on the same side of the sheet only at each end of the sheet thereby making the ends of the sheet thicker than a rest of the sheet, the fabric material having a coefficient of friction less than that of the cable relative to the conduit; encasing the cable in the fabric material by folding the fabric material and positioning the cable within the fabric material; and attaching the separate layers so as to confine the cable within the fabric material without attaching the fabric material to the cable, and so as to form a wing extending outwardly from the cable so as to form a prepared cable.

4. The method of claim 3 further comprising a step of inserting the prepared cable into the conduit, whereby the step of inserting the prepared cable may be facilitated by engaging only the wing.

5. The method of claim 3 further comprising a step of selectively utilizing the wing when ultimately inserting the prepared cable into a conduit.

6. The method of claim 3 further comprising a step of selectively attaching the wing to a pulling device thereby preparing the cable for insertion cable into a conduit.

* * * * *